United States Patent
Sugiyama (10) Patent No.: US 8,384,962 B2
(45) Date of Patent: Feb. 26, 2013

(54) DEVICE FOR SETTING COLOR PRINT LIMIT MODE ACCORDING TO PREFERENCE SET ON PER-PAGE BASIS

(75) Inventor: Takashi Sugiyama, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 701 days.

(21) Appl. No.: 12/604,938

(22) Filed: Oct. 23, 2009

(65) Prior Publication Data

US 2010/0110458 A1    May 6, 2010

(30) Foreign Application Priority Data

Oct. 31, 2008   (JP) ................................. 2008-282240

(51) Int. Cl.
*H04N 1/50* (2006.01)
*H04N 1/56* (2006.01)

(52) U.S. Cl. .................. 358/3.24; 358/501; 358/530

(58) Field of Classification Search .................. 358/1.9, 358/1.2, 3.24, 1.13, 1.18, 501, 515, 518–524, 358/530, 537, 538
See application file for complete search history.

(56) References Cited

U.S. PATENT DOCUMENTS

| | | | | |
|---|---|---|---|---|
| 5,801,846 A * | 9/1998 | Nobuta | .......................... | 358/530 |
| 7,088,462 B2 * | 8/2006 | Bhogal et al. | .................. | 358/1.9 |
| 7,090,417 B2 * | 8/2006 | Roztocil et al. | .............. | 358/1.18 |
| 7,760,372 B2 * | 7/2010 | McCarthy et al. | ........... | 358/1.13 |
| 2003/0193692 A1 | 10/2003 | Matsuyama | | |
| 2004/0036901 A1 * | 2/2004 | Nakane | ......................... | 358/1.13 |
| 2007/0285687 A1 * | 12/2007 | Okuyama | ....................... | 358/1.9 |
| 2008/0112010 A1 | 5/2008 | Matsuo | | |
| 2010/0067027 A1 * | 3/2010 | Kunieda | ......................... | 358/1.9 |

FOREIGN PATENT DOCUMENTS

| | | |
|---|---|---|
| JP | 11-147352 | 6/1999 |
| JP | 11-221945 | 8/1999 |
| JP | 2002-103753 | 4/2002 |
| JP | 2003-280879 | 10/2003 |
| JP | 2003-288197 | 10/2003 |
| JP | 2003-304406 | 10/2003 |
| JP | 2005-238788 | 9/2005 |
| JP | 2006-351038 | 12/2006 |
| JP | 2008-123353 | 5/2008 |
| JP | 2008-210330 | 9/2008 |

OTHER PUBLICATIONS

Japanese Office Action with English translation dated Aug. 17, 2010.

* cited by examiner

*Primary Examiner* — Scott A Rogers
(74) *Attorney, Agent, or Firm* — Scully, Scott, Murphy & Presser, P.C.

(57) ABSTRACT

An image processing system includes a preference designating unit and a printer. The preference designating unit is configured to designate one or more preferential print pages from pages included in a print job so as to be color printed preferentially to non-designated pages included in the print job. The printer performs color printing of the one or more preferential print pages.

18 Claims, 7 Drawing Sheets

DEVICE FOR SETTING COLOR PRINT LIMIT MODE ACCORDING TO PREFERENCE SET ON PER-PAGE BASIS

CROSS REFERENCE TO RELATED APPLICATION

This application claims priority from Japanese Patent Application No. 2008-282240 filed Oct. 31, 2008. The entire content of the priority application is incorporated herein by reference.

TECHNICAL FIELD

The present invention relates to an image processing system, an image processing device, and an image forming device.

BACKGROUND

There has been known an image processing system capable of setting a color print limit mode in which it is possible to limit the number of color prints in one job. When the number of printed color sheets has reached the maximum limit, the remaining pages are printed monochromatically upon converting color data to monochrome data. Alternatively, further printing of the remaining pages is not performed.

Given the limitation of the number of color prints, the pages that want to be color printed may not be color printed. Instead, the pages that may not be color printed are color printed.

SUMMARY

In view of the foregoing, according to one aspect, a preference designating unit is configured to designate one or more preferential print pages from pages included in a print job so as to be color printed preferentially to non-designated pages included in the print job.

DETAILED DESCRIPTION

An image processing system according to one embodiment of the invention will be described with reference to FIGS. 1 to 6. First, an electrical arrangement of image processing system will be described with reference to FIG. 1.

Figure 1:
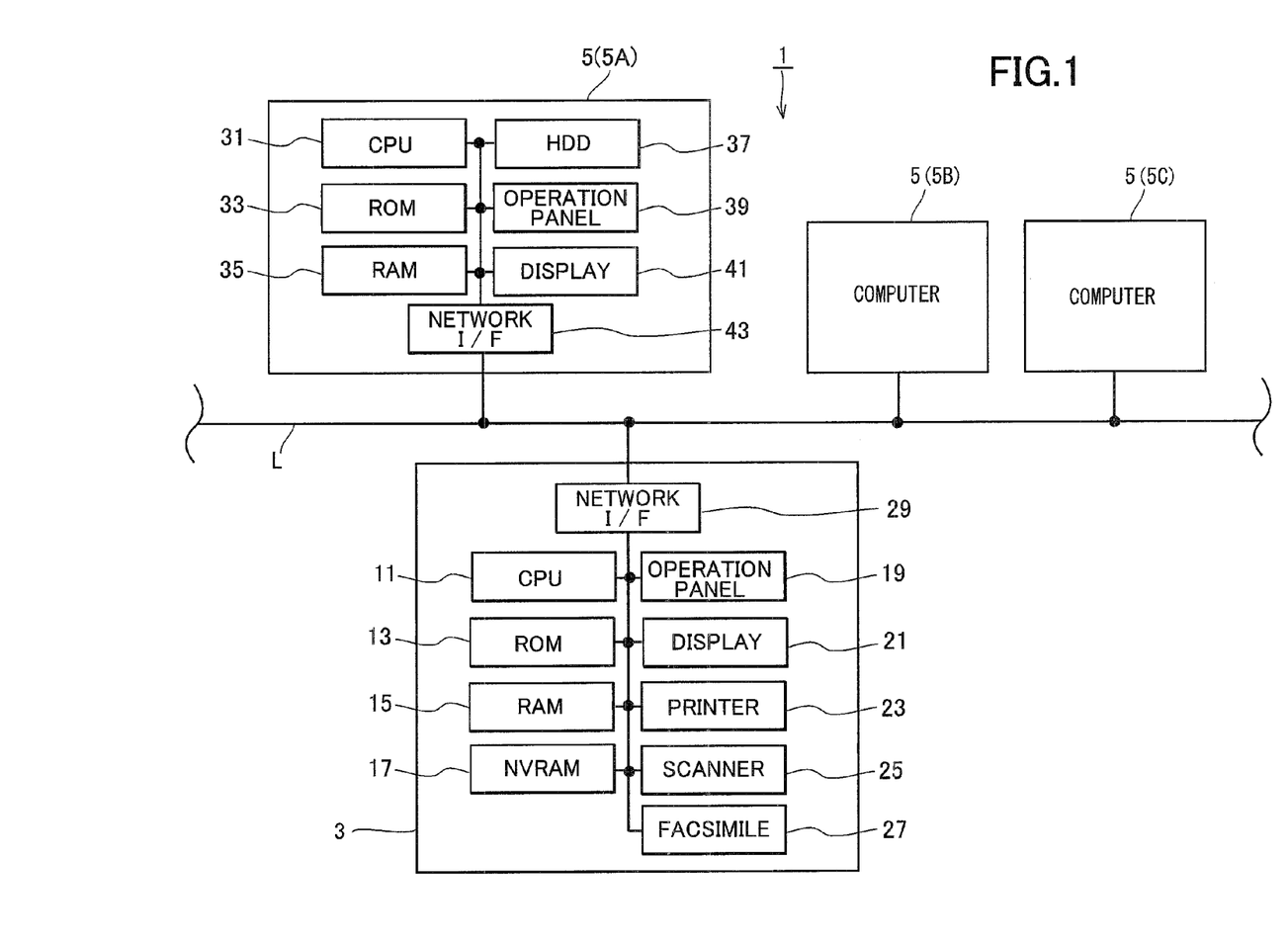
FIG. 1 a block diagram showing the arrangement of an image processing system according to one embodiment of the invention.

As shown in FIG. 1, the image processing system 1 includes an image forming device 3 and a plurality of computers 5 (three in FIG. 1). Each computer 5 serves as an image processing device. Note that the computers are generally designated by reference numeral 5 but three individual computers as illustrated in FIG. 1 are specifically designated by reference symbols 5A, 5B and 5C. The image forming device 3 and the computers 5 are mutually connected to one another with a communication line L. Amongst the plurality of computers 5, the computer 5A is a user's management computer having a managing authority. The remaining computes are also the user's computers but no managing authority is awarded. The basic hardware structure of each computer 5 remains the same regardless of whether or not a managing authority is awarded. FIG. 1 shows an electrical arrangement of only the computer 5A and illustration of electrical arrangements of the remaining computers is dispensed with for the purpose of brevity.

The image forming device 3 is, for example, a multifunction peripheral having a print function, a scanner function, a copy function, and a facsimile transmission/reception function. The image forming device 3 includes CPU 11, ROM 13, RAM 15, NVRAM (Non-volatile RAM) 17, operation panel 19, display 21, printer 23, scanner 25, facsimile, and network interface (I/F) 29.

It should be noted that the image forming device 3 is not limited to the above-described multifunction peripheral but encompasses such devices having at least one of print function, copy function, and facsimile transmission/reception function. Further, an electrophotographic printer or an inkjet printer may be employed as the printer 23 of the image forming device 3.

The ROM 3 stores a control program for controlling basic operations of the image forming device 3. The image forming device 3 is operated under the aegis of the CPU 11. The CPU 11 executes processes in accordance with the program retrieved from the ROM 13 and temporarily stores the processed data in the RAM 15 or NVRAM 17.

The operation panel 19 includes a plurality of buttons, such as alphanumeric buttons. Various input operations, such as print request, copy request, or color print limitation, can be implemented through user's manipulation of the relevant buttons on the operation panel 19. The display 21 includes a liquid crystal display panel and lamps, and can display various set screens or operations statuses. The printer 23 can perform color or monochromatic printings on a sheet of paper based on print data. The scanner 25 reads images on an original document placed on a document table (not shown) and produces image data. The facsimile 27 transmits facsimile data to and receives facsimile data from a remote facsimile equipment through a telephone line (not shown). The network interface 29 is connected to the computers 5 via the communication line L, thereby enabling bidirectional data communications to be performed between the image forming device 3 and the computers 5 or between the respective computers 5.

As described, the computers 5 are of the same structure and each includes CPU 31, ROM 33, RAM 35, hard disk (HDD) 37, operation panel 39, display 41, and network interface (I/F) 43. The ROM 33 stores a program for selective color page print (to be described later) in addition to a program for controlling basic operations. The CPU 31 controls the operations of the computer 5 while retrieving the relevant program from the ROM 33 and temporarily stores the processed data in the RAM 35. The hard disk 37 stores various programs including application software for creating print data, print drivers, and so on.

The operation panel 39 is in the form of a keyboard and/or pointing device. The user can enter various instructions through the operation panel 39, which may be a print request or settings of preference to selected pages to be color printed. The display 41 is configured from, for example, a liquid crystal display, and is capable of displaying an input screen (see FIGS. 2 and 5) for setting the selective color page print. The network interface 43 is connected to the communication line L.

The term "selective color page print" as used herein means performing color print with respect to one or more print pages designated to be color printed preference to non-designated pages. The term "selective color page print" will be used on a print job basis. When one print job is submitted to the printer 23 of the image forming device 3, some pages to which preference is set are printed in color but the remaining pages are not. In other words, the image processing system 1 has a print limit function for limiting a print process to be carried out in the printer 23. The print limit function can, for example, limit the number of pages to be printed in color. To achieve the print limit function, a preference designating unit is provided for designating one or more print pages from pages included in a print job so as to be color printed preferentially to non-designated paged.

An administrator can set the limitations through manipulation of the operation panel 19 of the image forming device 3. The "selective color page print" is applicable regardless of whether or not the maximum color print number is set.

Figure 2:
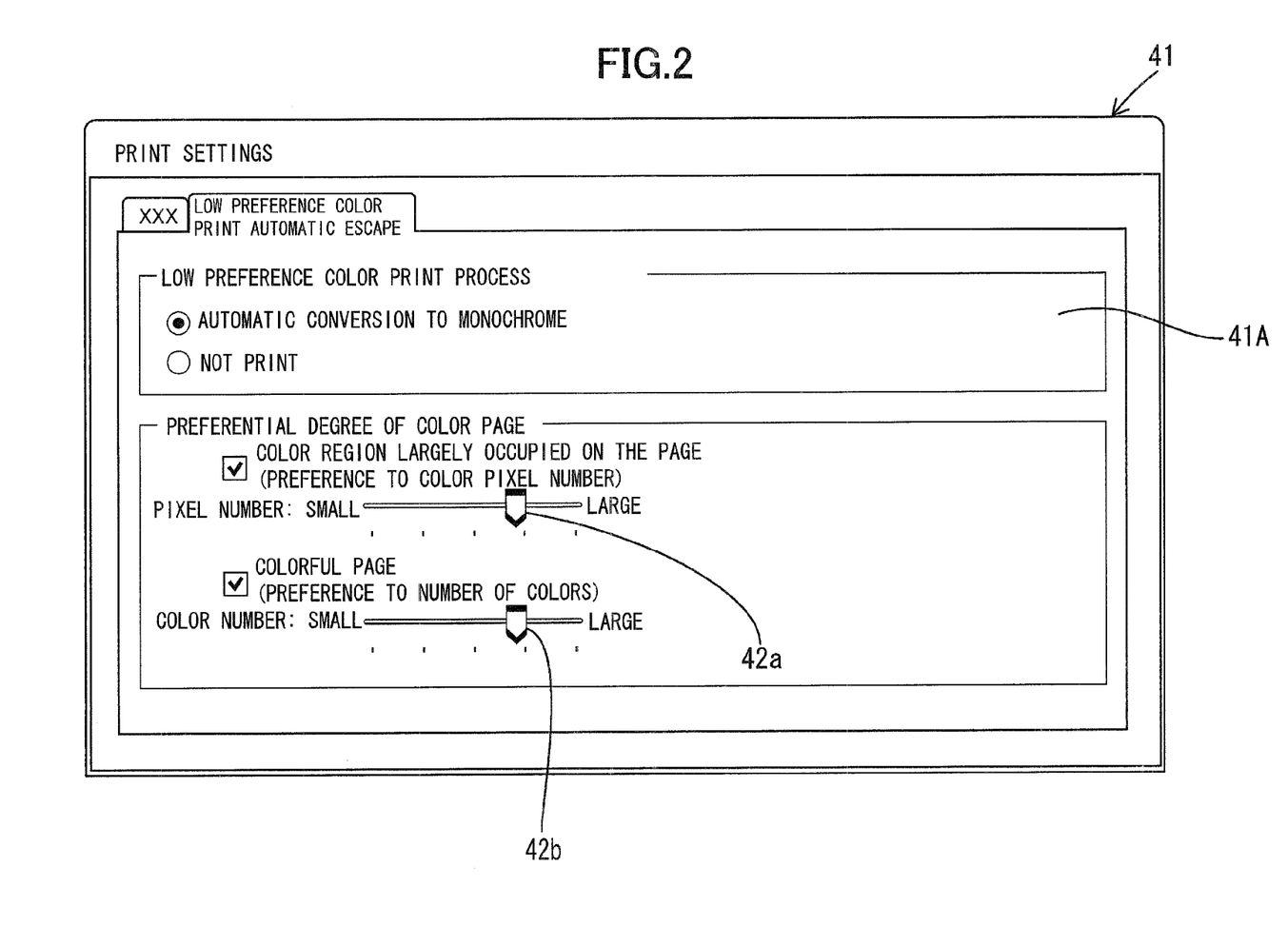
FIG. 2 shows a display screen for setting details about color print limitation.
Figure 3:
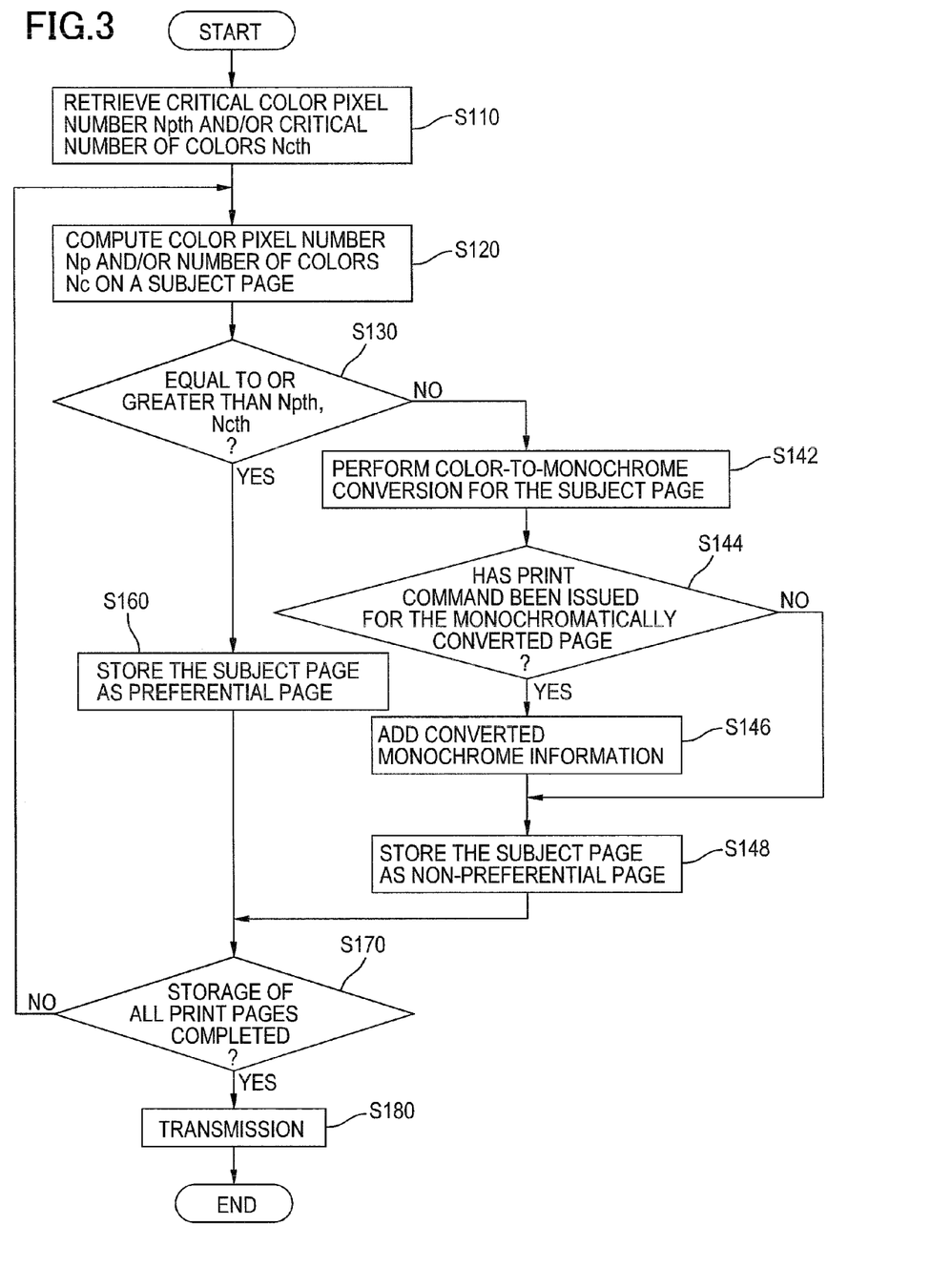
FIG. 3 is a flowchart illustrating a process for performing selective color print according to preference set on a per-page basis.
Figure 4:
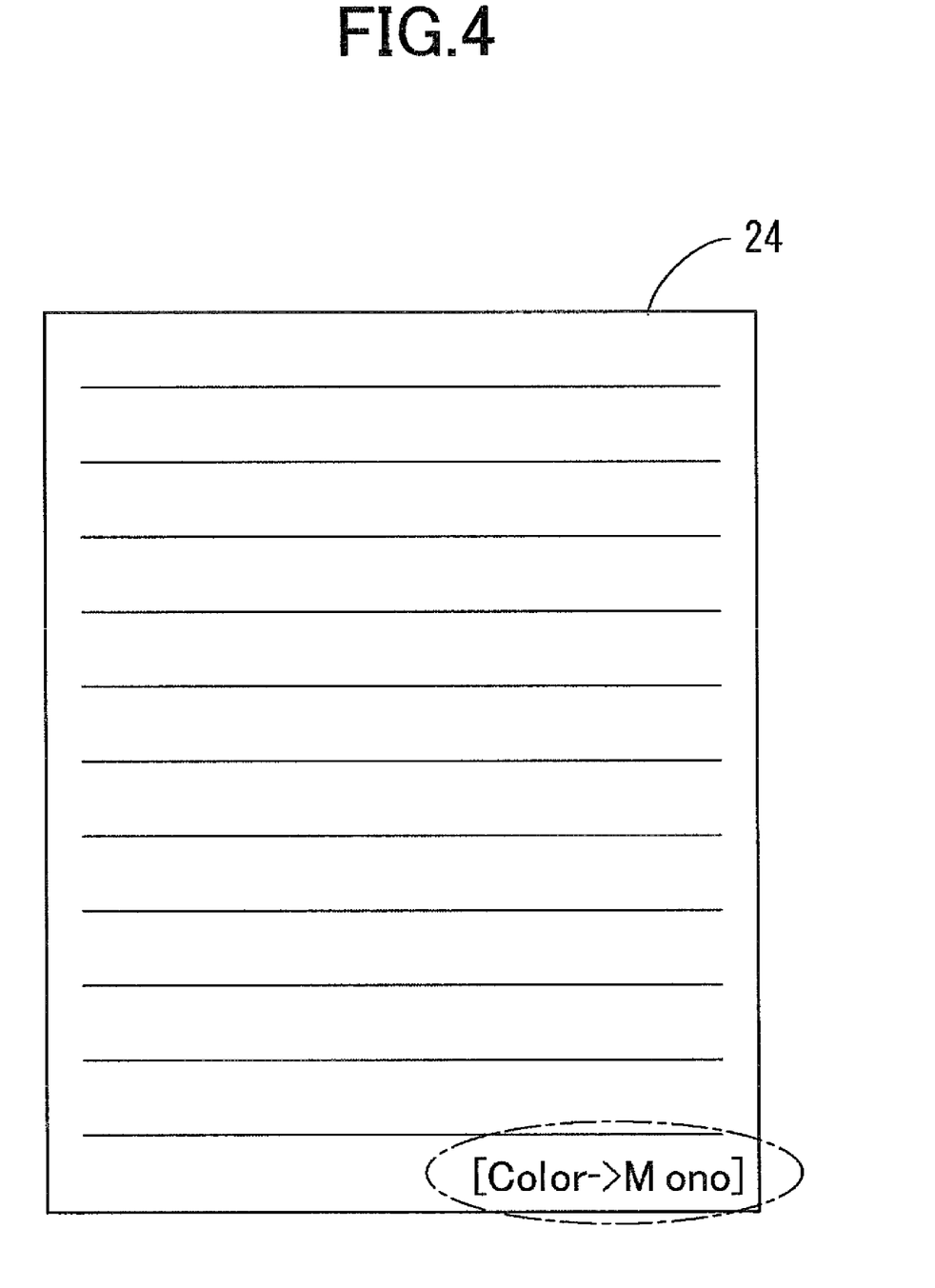
FIG. 4 shows a print example printed based on color-to-monochrome conversion data.

A color print job without limitation of the print page number will be described with reference to FIGS. 2 to 4. FIG. 2 shows one example of a set screen 41A for setting details of the preferential color page print. The set screen 41A appears on the display 41 and settings to this set screen 41A can be entered by a user through manipulation of the operation panel 39 of the computer 5. FIG. 3 is a flowchart illustrating the processes of the "selective color page print" to be executed when the print page number set in the color print job is equal to or less than the maximum color print number.

The set screen 41A in FIG. 2 shows set items with respect to the process for a low preference color print. The low preference color print means that the necessity for the color print is low, so that such page may be printed not in color but in monochrome, or alternatively such page may not be printed. In the set screen 41A, the user can select either one of the two options: (A) automatic conversion to monochrome, and (B) not print. FIG. 2 shows the case where the option (A) is selected. Preference in performing color print is set based either on the number of color pixels contained in one page or the number of colors used in one page. Critical number of color pixels Npth and critical number of colors Ncth can be set as desired by adjusting the positions of sliders 42a and 42b. Alternatively, the critical number of color pixels Npth and critical number of colors Ncth can be set as desired by directly inputting the numbers, or may be fixed numbers.

When the user wants to print data stored in his or her own computer 5 with the image forming device 3, the user is invited to perform various settings on the set screen 41A through manipulation of the operation panel 30 of his or her own computer 5. The user is further invited to perform other prescribed print settings, such as entering a name of print data file to be printed and the number of sets to be printed. Then, the CPU 31 of the computer 5 executes the process for the "selective color page print" as shown in FIG. 3 in accordance with the settings and a print command. In this embodiment, it is assumed that the option (A): "automatic conversion to monochrome" is selected and the print command has been received.

Referring to the flowchart shown in FIG. 3, in S110, the CPU 31 retrieves the critical color pixel number Npth and/or the critical number of colors Ncth. Subsequently, in S120, the CPU 31 computes the number of color pixels Np contained in the first page (subject page) and/or the number of colors Nc used in the subject page involved with a color print job. Such computations are executed based on the print data of the subject page. In S130, determination is made as to whether or not the computed results Np and Nc are greater than the critical number of color pixels Npth and critical number of colors Ncth, respectively. When the determination made in S130 is affirmative, i.e., the computed result Np is greater than the critical number of color pixels Npth and/or the computed result Nc is greater than the critical number of colors Ncth, the routine proceeds to S160 where the CPU 31 stores the first page in the RAM 35. In this case, the first page is treated as a preferential page for preferentially carrying out the color print.

More specifically, (1) when the number of color pixels Np on the subject page is equal to or greater than the critical number of color pixels Npth; (2) when the number of colors Nc used in the subject page is equal to or greater than the critical number of colors Nc; (3) when the number of color pixels Np on the subject page is equal to or greater than the critical number of color pixels Npth and also when the number of colors Nc used in the subject page is equal to or greater than the critical number of colors Nc, the CPU 31 stores the subject page in the RAM 35 as a preferential color print page. After execution of S160, the routine proceeds to S170.

On the other hand, when determination made in S130 indicates that the number of color pixels Np is not greater than the critical number of color pixels Npth and/or the number of colors is not greater than the critical number of colors, the routine proceeds to S142 where the CPU 31 performs a color-to-monochrome conversion of the print data for the subject page (first page). Color print is performed with respect only to such pages that are designated as preferential color print pages. Monochromatic print is performed with respect to the pages other than the preferential color print pages using the color-to-monochrome converted data. As such, in the case where all the pages need to be printed but not necessarily be in color, the color-to-monochrome conversion is necessary to print some pages monochromatically.

In S144, determination is made as to whether or not a user's print command for printing the monochromatically converted page has been issued. This determination can be made based on the status of the checkbox provided in the set screen 41A. As shown in FIG. 2, the set screen 41A shows a checkbox regarding the color-to-monochrome conversion. The user can make selections whether the color-to-monochrome conversion is to be performed. When a tick mark is inputted by the user into the checkbox, the color-to-monochrome conversion is performed. Accordingly, it can be determined that the print command has been issued if the checkbox contains the tick mark.

When it is determined that the print command has been issued, the routine proceeds to S146 where the CPU 31 adds to the subject page data information about the fact that the color-to-monochrome conversion has been performed. For example, as shown in FIG. 4, indication that the color-to-monochrome conversion has been performed is printed at the bottom of the subject page 24. In this manner, the user is informed of the page information about the change from the color print to the monochromatic print, allowing the user to more easily perform the print job.

In S148, the subject page data containing the conversion indicating data is stored in the RAM 35 as non-preferential print page. After execution of S148, the routine proceeds to S170. On the other hand, determination made in S144 indicates that instructions for printing the color-to-monochrome conversion data on the subject page is not available, the routine proceeds directly to S148 where the print data of the color-to-monochrome converted page is stored in the RAM 35 as the non-preferential print page.

In S170, determination is made as to whether or not storage of all print pages has been completed. When the determination made in S170 is negative, the routine returns to S120 to execute the process for dealing with the following page. When it is determined that storage of all the print pages have been completed, the routine proceeds to S180 where the CPU 31 transmits entirety of the page data stored in the RAM 35 to the image forming device 3 as print data for the color print job, whereupon the entire process is ended. The CPU 31 may transmit the print data to the image forming device 3 on a per-page basis rather than transmitting the print data en bloc.

The CPU 11 of the image forming device 3 receives the print data of the color print job transmitted from the computer 5 and performs color print of the preferential color print pages and also performs monochromatic print of the non-preferential print pages in the printer 23 based on the print data. As described, when an instruction has been given to indicate that the color-to-monochrome conversion has been performed, such indication is printed on the printed page as shown in FIG. 4.

In the "selective color page print" with no limitations for the print page number in a color print job, the CPU 31 seeks for the print page satisfying the conditions that the number of color pixels Np is equal to or greater than the critical number of color pixels Npth and/or the number of colors Nc is equal to or greater than the critical number of colors. The pages that meet the conditions are designated as preferential color print pages and printed in color with the printer 23 of the image forming device 3. Accordingly, the pages that contain a large number of color pixels Np or a large number of colors can be preferentially printed in color. In other words, the preferential color print pages can be designated using the operation panel 39 and the CPU 31 and are printed with preference or priority.

The critical number of color pixels Npth and the critical number of colors can be set by the user as desired. The user is permitted to change the critical conditions depending upon the given situation, for example, depending upon the remaining number of pages allowed to be printed in color. Even in the case where the color print job is free from the print page number limitation, only the pages that the user wants to print in color can be preferentially printed, resulting in reduction in cost and time for the color print.

Figure 5:
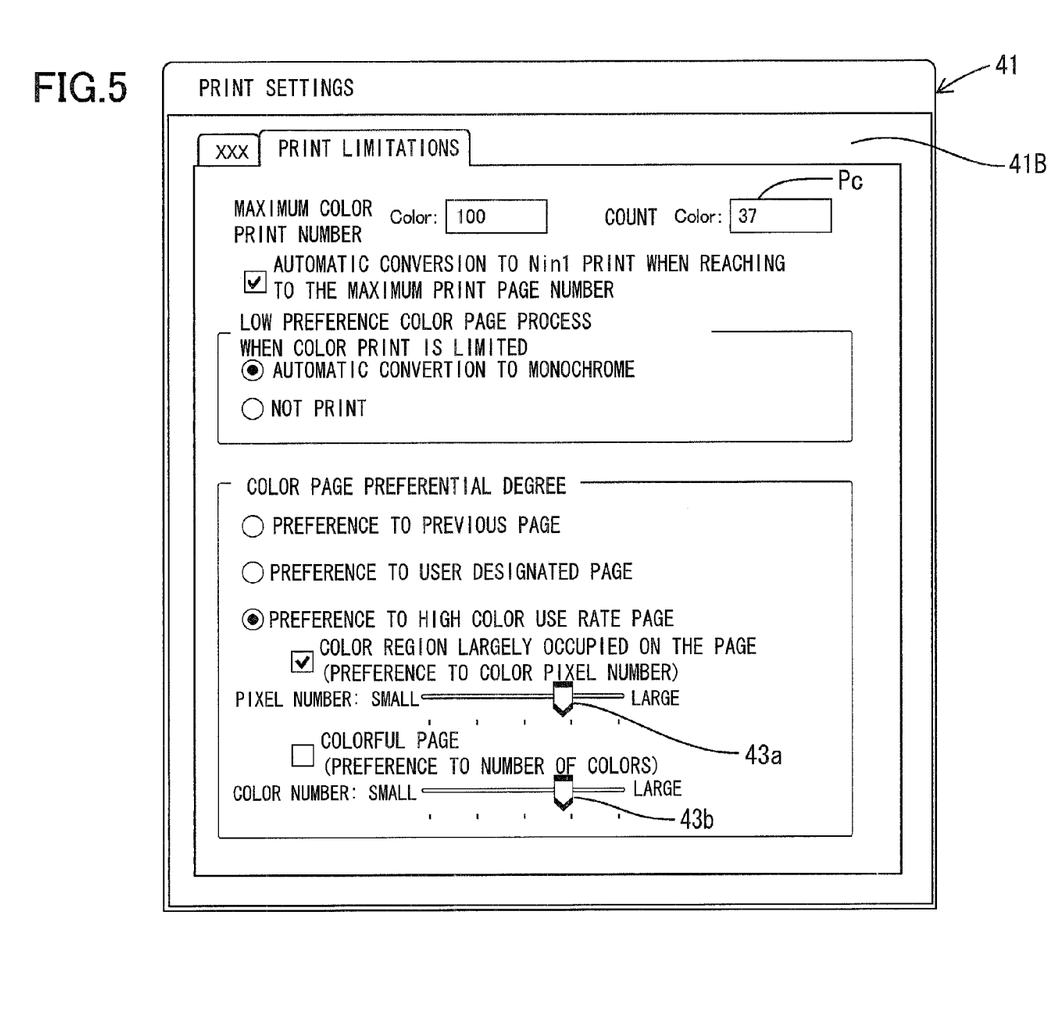
FIG. 5 shows a display screen for setting details about color print limitation.
Figure 6:
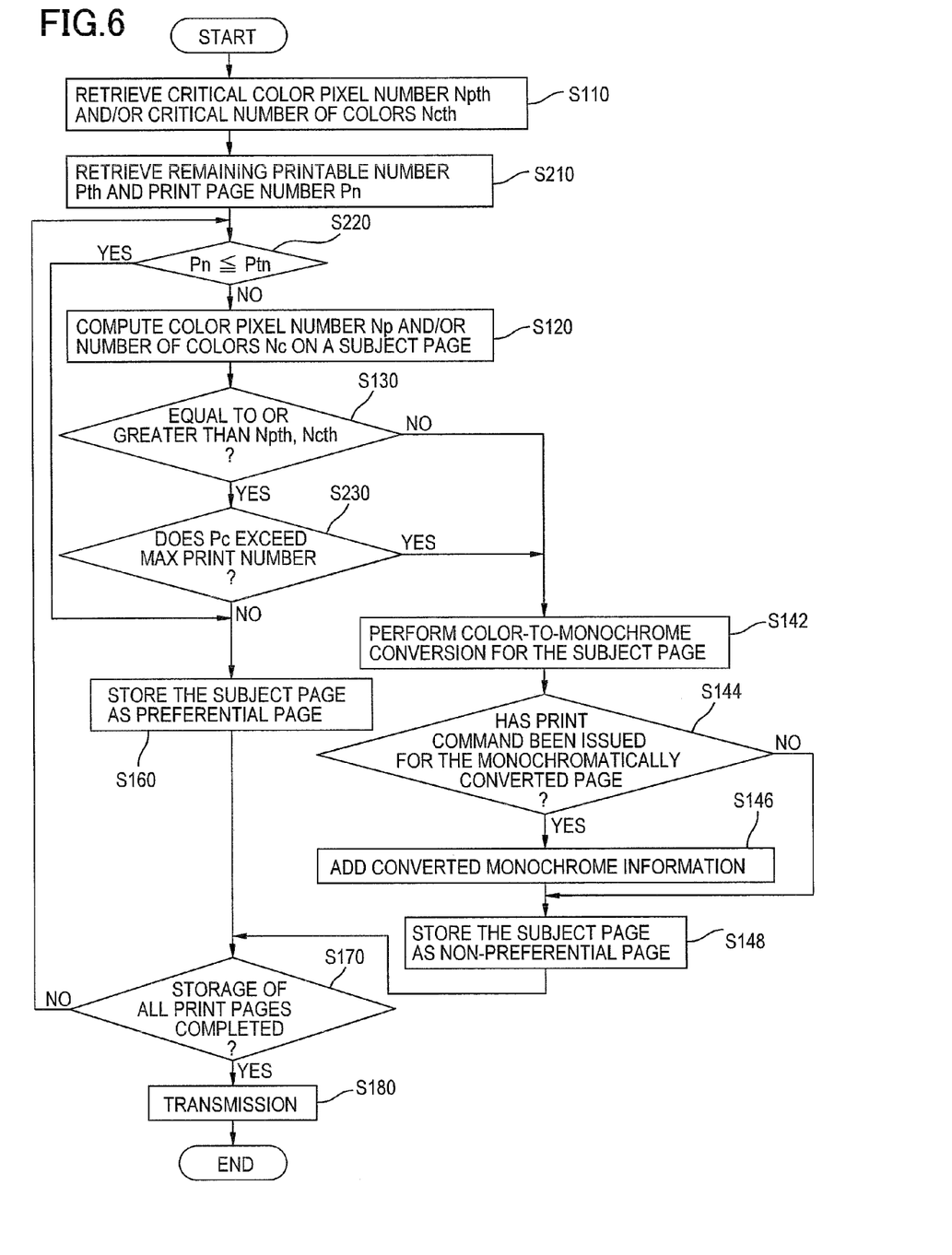
FIG. 6 is a flowchart illustrating a process for performing selective color print according to preference set on a per-page basis.

The color print job with limitation of the printable number of pages will be described with reference to FIGS. 5 and 6. More specifically, the following description pertains to a "selective color page print" to be carried out when a print page number Pn (the number of pages to be printed with respect to the print job) exceeds a possible or maximum color print page number during execution of the color print job. FIG. 5 shows one example of a set screen 41B used for setting details of the print limitations so that the image forming device 3 is operated in accordance with the settings. Settings to the set screen 41B can be entered through manipulation of the operation panel 39. FIG. 6 is a flowchart illustrating processes of the "selective color page print" when the print limitation is set as in FIG. 5.

The set screen 41B shown in FIG. 5 includes information about the print limitation to be applied to the image forming device 3 and set items. The set items include a maximum color print number indicating the maximum number of pages allowed to perform color printing, and a printed page number (count) Pc indicating the number of pages which have already been color printed. The maximum color print number is inputted through manipulation of the operation panel 19 of the image forming device 3. Hence, the user cannot rewrite the maximum color print number indicated on the set screen 41B. The same is true with respect to the count number.

Depending upon the print limitation set in the set screen 41B, the color print job is automatically changed to an Nin print meaning that a plurality of pages is printed on one sheet of paper while reducing the size of each page. The Nin print is performed when the page count number Pc has reached or exceeded the maximum color print number. In this embodiment, whether the automatic change to the Nin print is to be performed can be optionally selected by the user.

When the color print limitation is set, that is, when the printed page number Pc has exceeded the maximum color print number, the user is allowed to select either "option (A): automatic conversion to monochrome" or "option (B): not print" as the operation to be performed by the image forming device 3, similar to the set screen 41A shown in FIG. 2. The option (A) is selected in the example shown in FIG. 5.

The user is allowed to select the color page print preferential degree from three options including "option (C): preference to previous page", "option (D): preference to user designated page" and "option (E): preference to high color use rate page". Specifically, in this embodiment, the user can designate the preferential page that is to be color printed preferentially than other pages depending upon the given situation by selecting one option from the predetermined three options (C) to (E). The desired option can be designated through manipulation of the operation panel 39. When the option (E) is selected, one of two sub-options can further be selected. That is, the high color use rate page is classified into two types, one being a page in which color region is largely occupied, that is, the page in which a large number of color pixels is contained, and the other being a colorful page in which a large number of colors are used. In other words, the user can select either preference to the number of color pixels or preference to the number of colors. The sub-option "color region largely occupied on the page" is selected in the example shown in FIG. 5. As in the case of FIG. 2 for setting details of the preferential degree of color page, the two sub-options have associated sliders 43a and 43b. The critical number of color pixels Npth and the critical number of colors Ncth can be set by moving the sliders 43a and 43b to desired positions.

While the above-described embodiment selects "option (E): preference to high color use rate page" as the color page print preferential degree, the option (C) or (D) may be selected instead. The "option (C): preference to previous page" is an option to give preference to earlier-order or small numbered pages. Specifically, when the option (C) is selected, preference to color print is sequentially given to the first page and the pages that follow.

In accordance with the settings in the set screen 41B and a print command, the process for the "selective color page print" is executed as shown in the flowchart of FIG. 6. In this embodiment, it is assumed that a print command has been issued under the selection of "option (A): automatic conversion to monochrome" and "option (E): preference to high color use rate page". In the following description, the same processes as those in the flowchart of FIG. 3 are denoted by the same step numbers and the description thereof is omitted.

In S210 of the flowchart in FIG. 6, the CPU 31 retrieves the remaining printable color print number Pth and a print page number Pn. The remaining printable color print number Pth is equal to a number subtracting the current page count number Pc from the maximum color print number. In the example shown in FIG. 5, the remaining printable color print number Pth is 63 (=100−37).

In S220, the CPU 31 determines whether or not the print page number Pn is equal to or less than the remaining printable color print number Pth. When the determination made in S220 is affirmative, i.e., Pn≦Pth, the routine proceeds to S160 where the subject page is stored as a preferential page. Because all the remaining pages in the color print job can be color printed in the case where the affirmative determination is made in S220, the processes in S160 and S170 are repeatedly executed until storage of all of the pages have been done. In this case, color print of all the pages in the print job is performed.

On the other hand, when the print page number Pn exceeds the remaining printable color print number Pth, the processes in S120, S130, S230, S142, S144, S146, S148, S170 and S180 are sequentially executed as are done also in the flowchart of FIG. 3. However, it should be noted that the processes executed in the same step numbers in the flowcharts of FIGS. 3 and 6 are not exactly the same as will be described below.

In S130 in the flowchart of FIG. 6, when determination is made so that the number of color pixels Np contained in the subject page is equal to or greater than the critical number of color pixels Npth and/or the number of colors used in the subject page Nc is equal to or greater than the critical number of colors Ncth, the CPU 31 determines in S230 whether or not the number of pages that have already been color printed exceeds the maximum color print number. In other words, the CPU 31 determines whether or not the page count number Pc has exceeded the maximum color print number. When determination is made so that the page count number Pc has not exceeded the maximum color print number, the routine proceeds to S160 where print data for the subject page is produced.

On the other hand, when the page count number Pc has exceeded the maximum color print number (S230: YES), color printing of the subject print is no longer possible. Hence, the routine proceeds to S142 where a process is executed to switch the color print to the monochromatic print for printing the subject page.

In the "selective color page print" for the case where the color print page number Pn exceeds the maximum color print number, the same advantages can be obtained as in the case where there is no limitation in print page number. Particularly, the "selective color page print" can be more appropriately applicable to the case where there is a limitation in color print number in a color print job. Specifically, in comparison with the case where there is no limitation in color page print number, it is advantageous in that color print is performed preferentially with respect to such pages that want to be color printed with high degree of desire. It is convenient to perform a color print job with a limitation of the maximum color print page number.

Although the present invention has been described with respect to specific embodiments, it will be appreciated by one skilled in the art that a variety of changes may be made without departing from the scope of the invention.

Figure 7:
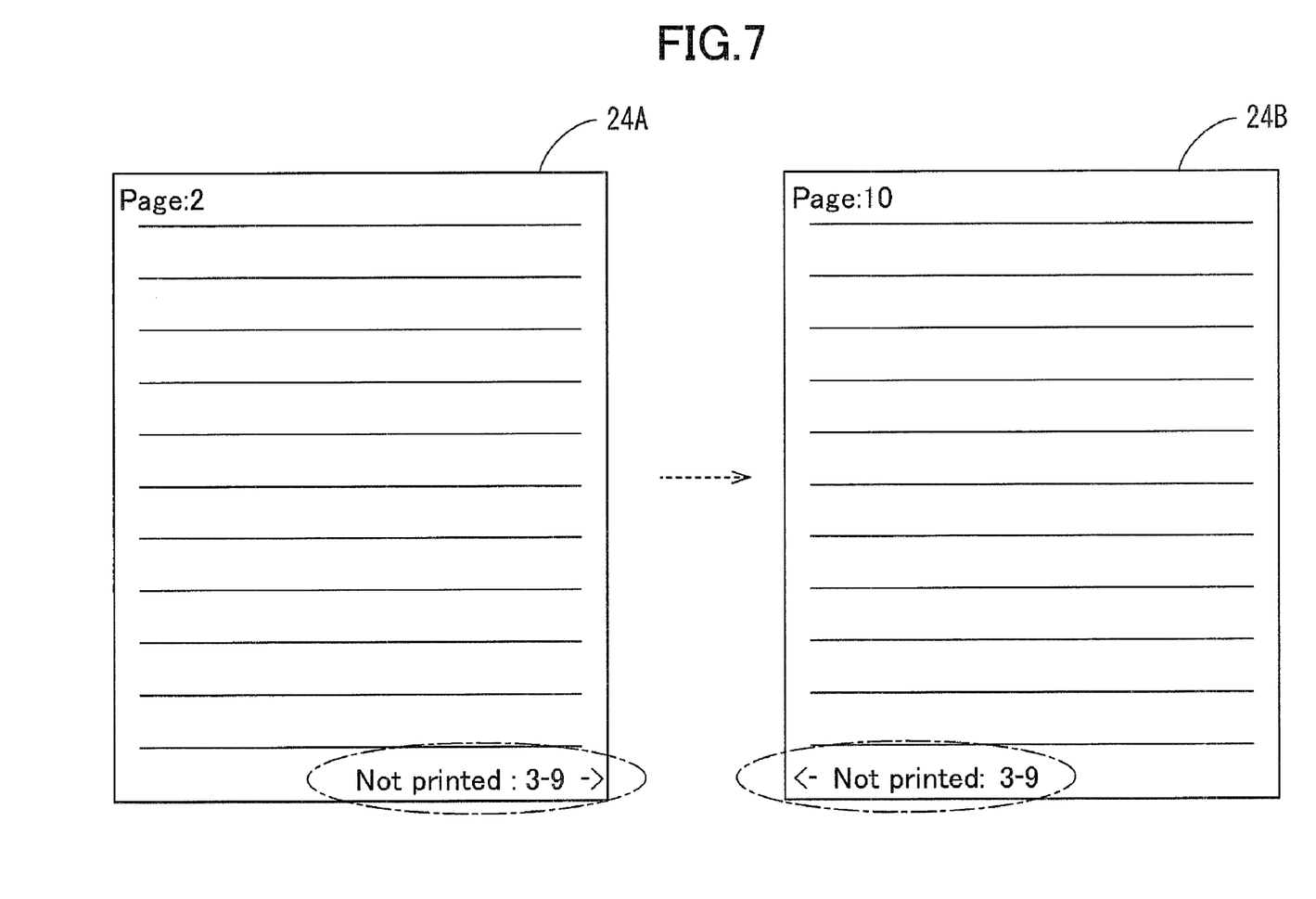
FIG. 7 shows a print example printed based on print inhibition page data.

In lieu of the option (A) shown in FIGS. 2 and 5, the "option (B): not print" can be selected. When it is the case, the CPU 31 prohibits printing the subject page. That is, the CPU 31 does not produce print data with respect to the subject page. Selection of the option (B) can save cost of printing, as the pages that are not absolutely necessary for the color print are not printed. As shown in FIG. 7, information about the print inhibited page may be printed to the bottom portions of the previous and following pages (24A, 24B) of the print inhibited page. To this effect, the CPU 31 adds information about the print inhibited page to the page data for the previous and following pages. Information about the page not printed is given to the user in such a way, the user can easily recognize the print status. Information about the page not printed may be printed either on the previous page or the following page.

In selecting a color page print preference, either the "option (C): preference to previous page" or the "option (D): preference to user designated page" may be selected in lieu of the option (E) shown in FIG. 5. In such a case, the process shown in FIG. 6 needs to be modified so that steps 110 and 120 are dispensed with, and determination as to whether or not the subject page is the "previous page" or "user designated page" has to be executed in lieu of the process executed in S130. When the "option (D): preference to user designated page" is selected, it is desirable to provide a checkbox next to the statement of the option (D) for allowing the user to input the page to be preferentially color printed.

In the flowcharts shown in FIGS. 3 and 6, steps S144 and 146 may be dispensed with so that printing the monochromatically converted print data may not be performed.

While an image processing system has been described as an embodiment of the invention, only the image forming device 3 may be configured to implement the above-described processes.

What is claimed is:

1. An image processing system comprising:
a preference designating unit that is configured to designate one or more preferential print pages from pages included in a print job so as to be color printed preferentially to non-designated pages included in the print job;
a printer that is configured to perform color printing of the one or more preferential print pages designated by the preference designating unit; and
a first determining unit that is configured to determine that a print page included in the print job has color pixels equal to or greater than a first number, wherein the preference designating unit designates the print page that is determined by the first determining unit as having color pixels equal to or greater than the first number as a preferential page.

2. The image processing system according to claim 1, wherein the first number is a fixed number selectable as desired.

3. The image processing system according to claim 1, further comprising a second determining unit that is configured to determine that a print page included in the print job is configured from different colors with a number equal to or greater than a second number, wherein the preference designating unit designates the print page that is determined by the second determining unit as being configured from different colors with the number equal to or greater than the second number as a preferential page.

4. The image processing system according to claim 3, wherein the second number is a fixed number selectable as desired.

5. The image processing system according to claim 1, further comprising a maximum color print number setting unit that is configured to set a maximum color print number for a print job to be submitted to the printer, wherein the printer performs color printing of the one or more preferential print pages designated by the preference designating unit when print pages included in the print job exceeds the maximum color print number.

6. The image processing system according to claim 5, wherein the preference designating unit comprises an input unit that allows a user to input the one or more preferential print pages.

7. The image processing system according to claim 1, further comprising a maximum color print number setting unit that is configured to set a maximum color print number for a print job to be submitted to the printer, wherein the preference designating unit designate all pages included in the print job as the preferential print pages when the pages included in the print job is equal to or less than the maximum color print number.

8. The image processing system according to claim 1, further comprising an inhibiting unit that is configured to inhibit printing of the non-preferential print pages with the printer.

9. The image processing system according to claim 8, further comprising a print control unit that is configured to modify the print job so that information about the one or more print inhibited pages is printed on both a first preferential print page that immediately precedes to the one or more print inhibited pages and a second preferential print page that immediately follows the one or more print inhibited pages.

10. The image processing system according to claim 1, further comprising a conversion unit that is configured to convert color print data of the non-preferential print pages to monochromatic print data, the printer performing printing of the non-preferential print pages monochromatically.

11. The image processing system according to claim 10, further comprising a print control unit that is configured to modify the print job so that information about the conversion to monochromatic print data is printed n the non-preferential print pages.

12. An image forming device comprising:
a preference designating unit that is configured to designate one or more preferential print pages from pages included in a print job so as to be color printed preferentially to non-designated pages included in the print job;
a printer that is configured to perform color printing of the one or more preferential print pages designated by the preference designating unit; and
a first determining unit that is configured to determine that a print page included in the print job has color pixels equal to or greater than a first number, wherein the preference designating unit designates the print page that is determined by the first determining unit as having color pixels equal to or greater than the first number as a preferential page.

13. The image forming device according to claim 12, further comprising a second determining unit that is configured to determine that a print page included in the print job is configured from different colors with a number equal to or greater than a second number, wherein the preference designating unit designates the print page that is determined by the second determining unit as being configured from different colors with the number equal to or greater than the second number as a preferential page.

14. An image processing device comprising:
a preference designating unit that is configured to designate one or more preferential print pages from pages included in a print job so as to be color printed preferentially to non-designated pages included in the print job;
a print data creating unit that is configured to create print data including data regarding the one or more preferential print pages designated by the preference designating unit;
a transmitting unit that is configured to transmit the print data to a printer; and
a first determining unit that is configured to determine that a print page included in the print job has color pixels equal to or greater than a first number, wherein the preference designating unit designates the print page that is determined by the first determining unit as having color pixels equal to or greater than the first number as a preferential page.

15. The image processing device according to claim 14, further comprising a second determining unit that is configured to determine that a print page included in the print job is configured from different colors with a number equal to or greater than a second number, wherein the preference designating unit designates the print page that is determined by the second determining unit as being configured from different colors with the number equal to or greater than the second number as a preferential page.

16. An image forming device comprising:
a printer unit that is configured to print images in color or monochrome;
a communication unit that is configured to receive a print job; and
a control unit connected to both the printer unit and the communication unit,
wherein the control unit is configured to count a number of pages to be printed based on the print job received at the communication unit;
the control unit is configured to make determination as to whether or not the counted number of pages is equal to or greater than a first predetermined number;
the control unit is configured to control the printer unit to perform printing so that selected number of pages among the counted number of pages is printed in color and remaining number of pages thereamong is printed in monochrome when the determination indicates that the counted number of pages exceeds the first predetermined number; and
the control unit is configured to control the printer unit to perform printing so that all the counted number of pages is printed in color when the determination indicates that the counted number of pages is less than the first predetermined number.

17. The image forming device according to claim 16, wherein the control unit is configured to compute a number of pixels contained in a color region on each of the counted number of pages and determines that the page containing pixels equal to or greater than a second predetermined number is to be printed in color.

18. The image forming device according to claim 16, wherein the control unit is configured to compute a number of colors used in each of the counted number of pages and determines that the page using colors equal to or greater than a third predetermined number is to be printed in color.

* * * * *